(No Model.)  3 Sheets—Sheet 1.
H. HÖRBIGER.
VALVE.
No. 604,326.  Patented May 17, 1898.
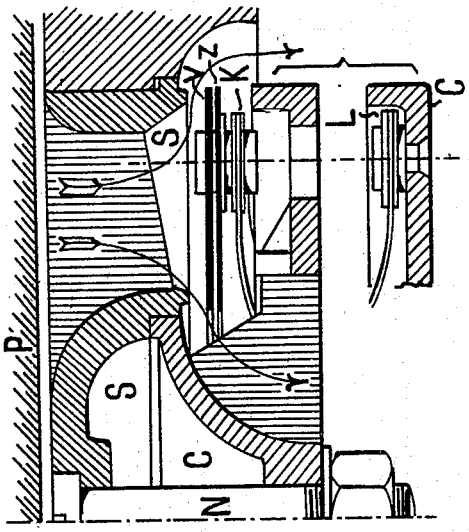
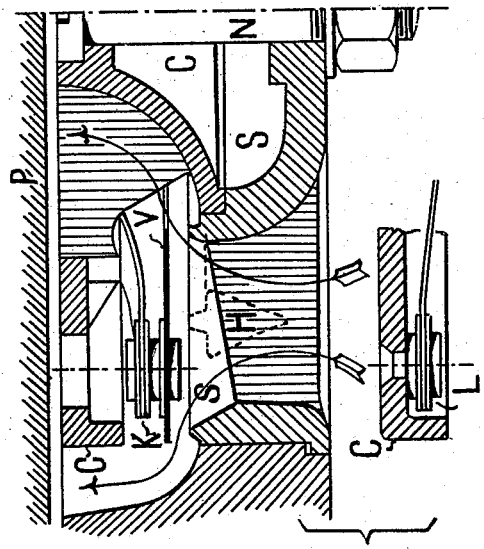
WITNESSES:
F. W. Wright.
S. C. Connor
INVENTOR
HANNS HÖRBIGER
BY Howson and Howson
HIS ATTORNEYS.

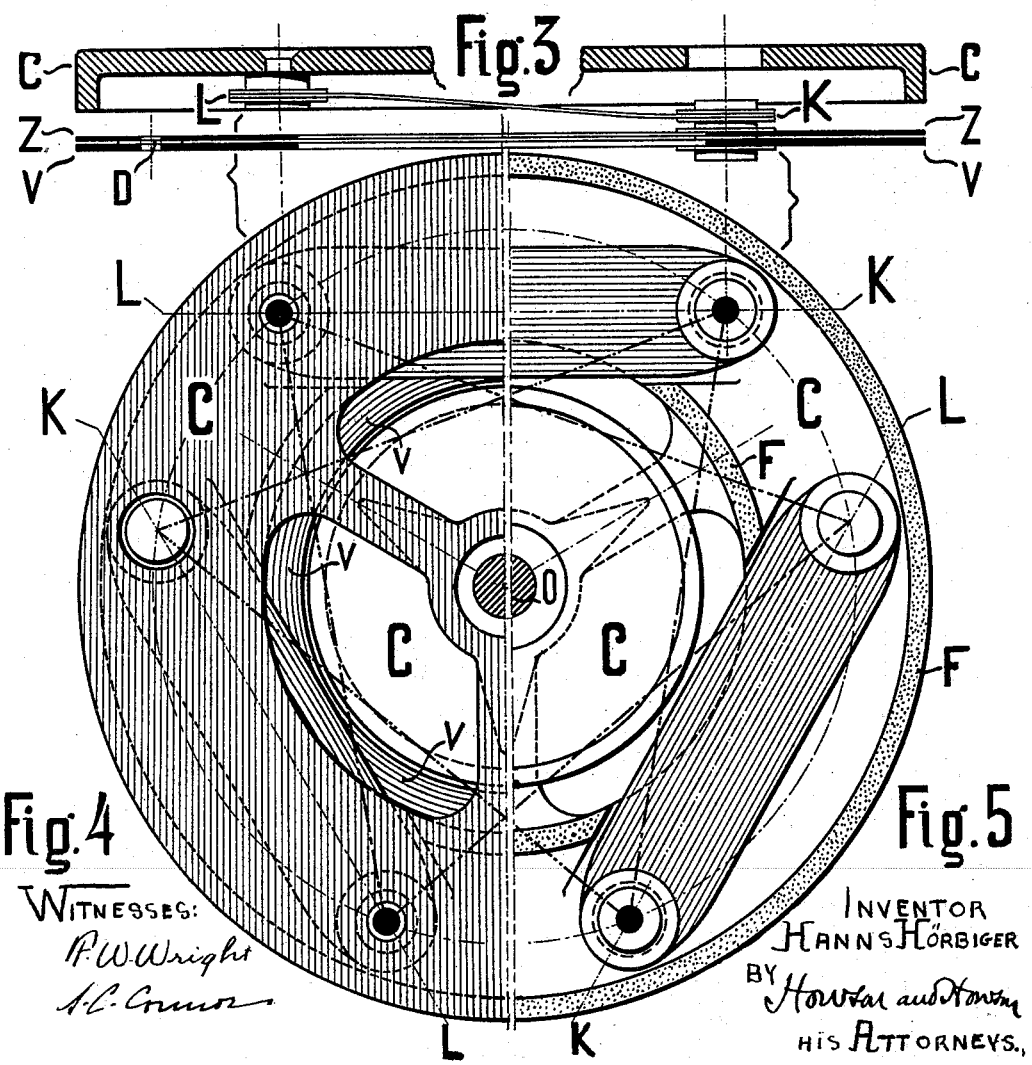

(No Model.) 3 Sheets—Sheet 3.

H. HÖRBIGER.
VALVE.

No. 604,326. Patented May 17, 1898.

Witnesses:
P. W. Wright
S. C. Connor

Inventor
Hanns Hörbiger
By Howson and Howson
His Attorneys.

United States Patent Office.

HANNS HÖRBIGER, OF BUDA-PESTH, AUSTRIA-HUNGARY, ASSIGNOR OF ONE-HALF TO LADISLAUS LANG, OF SAME PLACE.

VALVE.

SPECIFICATION forming part of Letters Patent No. 604,326, dated May 17, 1898.

Application filed August 10, 1897. Serial No. 647,724. (No model.) Patented in Belgium August 16, 1895, No. 116,869; in Hungary October 25, 1895, No. 3,933; in France December 3, 1895, No. 249,475; in England October 13, 1896, No. 22,739; in Switzerland November 2, 1896, No. 13,351, and in Austria January 26, 1897, No. 47/250.

*To all whom it may concern:*

Be it known that I, HANNS HÖRBIGER, engineer, a subject of the Emperor of Austria-Hungary, residing at Buda-Pesth, Empire of Austria-Hungary, have invented Improvements in Valves, (for which I have obtained a patent in Hungary, No. 3,933, dated October 25, 1895; in Austria, No. 47/250, dated January 26, 1897; in France, No. 249,475, dated December 3, 1895; in Belgium, No. 116,869, dated August 16, 1895; in Great Britain, No. 22,739, dated October 13, 1896, and in Switzerland, No. 13,351, dated November 2, 1896,) of which the following is a specification.

My invention relates to circular or annular valves made of sheet metal for compressors, air-pumps, blowers, pumps, &c., and has for its object to guide such valves by means of elastic plate-like spring-links in such a manner that such guiding is effected absolutely free from friction, the valve remaining always parallel to its seat. The said links are arranged symmetrically around the center of the valve, so that such valve on opening and closing slightly oscillates around its perpendicular axis passing through its center.

Figure 10:
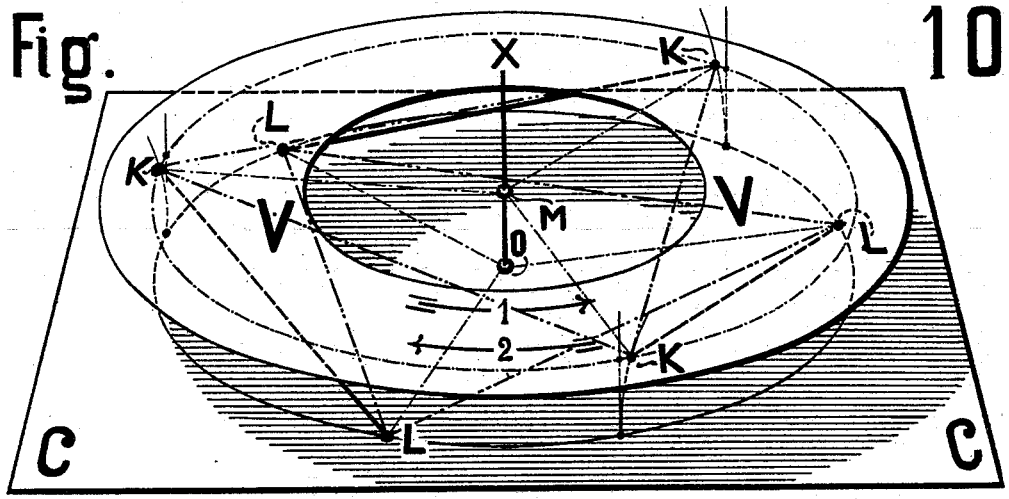
Figure 6:
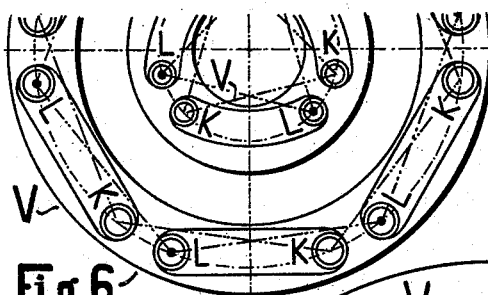

In the accompanying drawings, Figure 1 is a partial sectional view of one-half of a suction-valve constructed according to my invention. Fig. 2 is a sectional view of one-half of a pressure-valve. Figs. 4 and 5 are plan views, partly in section, of the back-stops and links shown in Figs. 1 and 2, respectively. Fig. 3 is a side elevation of one of the links, the valve and its back-stop being shown in section. Figs. 6, 7, 8, and 9 are plan views of modifications of my improved valve. Fig. 10 is a diagram in perspective, illustrating the operation of my improved valve.

In Figs. 1 to 5 the valves are arranged directly in a cylinder-cover and consist of the following parts, viz: the valve-seat S, the link-carrier C, forming at the same time the back-stop of the valve, the central screw N, the valve proper, V, and the links L K, which are secured at K to the valve and at L to the link-carrier C. P P indicate the piston-face in the dead-center position.

Figs. 4 and 5 show each a plan of one-half of the links L K and the carrier C illustrated in Figs. 1 and 2, respectively, the valve-seat being removed. In Fig. 5 the valve is also removed to show the links, while in Fig. 4 the valve-body is shown. For the sake of clearness the visible parts of the links are hatched with longitudinal lines, the visible parts of the valve with concentric circular lines, and the visible parts of the link-carrier, Fig. 4, with vertical lines. The part F of the link-carrier, Fig. 5, against which the valve rests when fully open, is distinguished by dotting.

In the suction-valve shown in Fig. 1, which normally should open when the speed of the piston is still low, the valve-body proper consists simply of a thin annular metal plate V. In the pressure-valve shown in Fig. 2 I have shown a valve particularly adapted for gas-compressing machines, which has to open at a higher piston speed and therefore with greater vehemence. I arrange in rear of the valve-disk V a buffer-disk Z, which is held at a suitable distance from the valve-disk V by washers D, Fig. 3.

Figure 7:
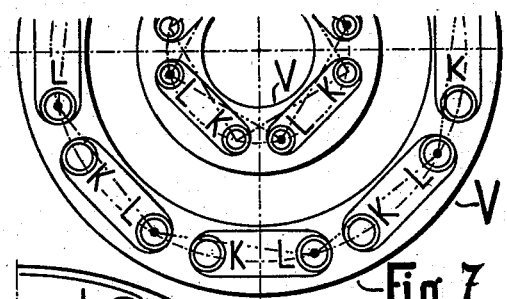

The space between the two disks becomes filled with the gas or liquid which is being pumped, causing these disks to form a cushion, which when the valve opens strike against the back-stop F on the link-carrier C, Fig. 5, and deaden the slight shock to the valve V and render such shock absolutely harmless, as the major part of the *vis viva* of the valve-body is spent in forcing out the gas or liquid from the space between the valve-disk and the buffer-disk. In case of stronger pressures and heavier valve-disks two or more buffer-disks Z, arranged one above the other, with the interposition of washers D, may be used for more efficiently deadening the shock to the valve on its striking against the back-stop. Suction-valves may also be cushioned in the same manner. This relatively light valve, whether cushioned or not, is connected with the link-carrier C by elastic links L K, resembling plate-springs, in such a manner that the points of attachment of such links on the link-carrier at L and on the valve-body at K are uniformly or substantially uniformly distributed on the periphery of circles concentric to the center of the valve-body, and thus constitute angles or corners of regular or substantially regular polygons concentric to the valve-center. The number of such links L K which I find give good results is three for small valves, as shown in Figs. 1 to 5, and four or more for larger valves, as shown in Figs. 6 to 9. These links are best made as long as possible, but preferably not so long but that they are still entirely covered by the valve-body. They may be either straight, as shown in Figs. 4, 5, and 7, or curved, and in the latter case they may be either concentric to the valve-center, Figs. 8 and 9, or eccentric to such center, as shown for the inner valve in Fig. 6.

For small circular valves, (as distinguished from annular valves,) or for valves having only a small central hole for the central screw and the link-carrier boss to pass through, two links may be used, having their points of attachment on the valve-body and on the link-carrier, respectively, situated diametrically opposite each other. In this case the two links have to be secured to the valve-body or to the link-carrier or to both in such a manner as to prevent them from turning on these points of attachment, as otherwise the valve would not be prevented from shifting laterally. All these links have one common characteristic feature—viz., that the valve on opening or closing slightly turns around its central vertical axis, as is best seen in the diagram, Fig. 10. There it will be seen that the point of attachment K of the link L K cannot move on a straight line perpendicular to the plane of the link-carrier C C, but must necessarily move on an arc on the surface of a cylinder. The pitch of such arc determines the amplitude of the oscillation of the valve-body in opening and closing. Thus in Fig. 10 the valve-body V will turn, on closing, in the direction of the arrow 1 and on opening in the direction of the arrow 2 around the axis O X or its center M. Therefore only the center M will move in a straight line, while all points of the valve proper will move on arcs drawn on a cylindrical surface. In practice elastic links rigidly secured to the valve-body and the link-carrier will be employed, which will have no friction or wear, and therefore no loosening and lateral shifting of the center of the valve can occur in the moment of closing.

Further, it will be seen from Fig. 10 that a very slight lateral movement of the center M relatively to the axis O X might occur, but only when the valve-body assumes an inclined position relatively to the valve-seat. The angle between the valve-body and the valve-seat cannot exceed a certain narrow limit. As long as the valve-body is parallel to the seat or to the link-carrier such a lateral shifting cannot occur whatever may be the length of the stroke of the valve.

The valve may be brought to an inclined position by hand; but in practical use the valve will not assume such an inclined position, because the resultants of the resistances of the links to the inertia of valve and to the pressure tending to open the valve have one common bearing-point—viz., the center M. In practice, therefore, the center M will be exactly in the axis O K in both extreme positions of the valve. Consequently the valve will move up and down as a whole in a direction perpendicular to the plane of its seat, notwithstanding the slight oscillation around its axis, as hereinbefore described, remaining always practically parallel to the plane of its seat.

The actual construction of the arrangement indicated by Fig. 10 is shown in Figs. 1 to 5. For the rigid straight lines elastic metal strips L K are substituted, which are connected with the valve-body and link-carrier by any known and suitable means, enabling these metal strips or links to oscillate freely by their elasticity, yet preventing them from turning or shifting. By such mode of connecting the links L K to the link-carrier and the valve-body nothing is altered in the theoretical method of guiding the valve-body before explained; but with such mode of connection the valve-body is practically enabled to be guided parallel to itself, no frictional resistance whatever having to be overcome. The initial elastic tension of the links is utilized to quickly overcome the small inertia of the valve-body and to automatically close the valve. It is obvious that it will be possible to arrange the valve at any desired position in the valve-casing—horizontal, vertical, or inclined at any angle.

The main object of the above-described method of guiding the valves is to reduce to a minimum the moving mass of the valve for a given area of the port controlled by such valve. This object I am enabled to attain by making the valve-body annular in shape and just thick enough to resist the pressure of the gas or liquid and by dispensing with any sliding guides or other parts which might interfere with the free unobstructed movement of the valve. Thus the total resistance met with by the valve in moving is reduced to a minimum.

The reduction of the mass of the valve and the rapid quiet closing of the valve resulting therefrom permit of the construction of the valve-seat in the form of a blunt edge in order to reduce the difference of pressure on both sides of the valve necessary for opening the same to a minimum by making the areas of the valve exposed to such different pressure nearly equal.

I propose to make the width of the valve-body considerably greater than the stroke of the valve. With annular valves for high pressure I do not intend to diminish the width of the port controlled by the valve to permit me to use relatively thin valve-plates; but I prefer to arrange for this latter purpose one or more supporting-rings H between the edges of the valve-seat, as shown by dotted lines in Fig. 1.

To further diminish the mass of the valve and to stiffen the same, it may be made curved in cross-section.

Figure 8:
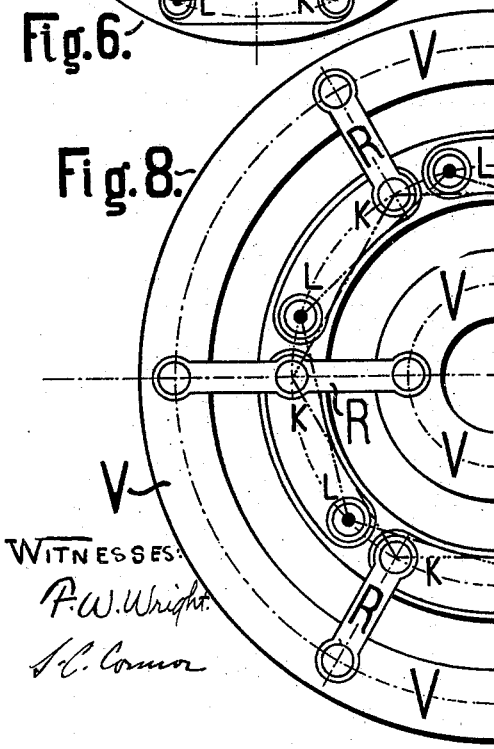
Figure 9:
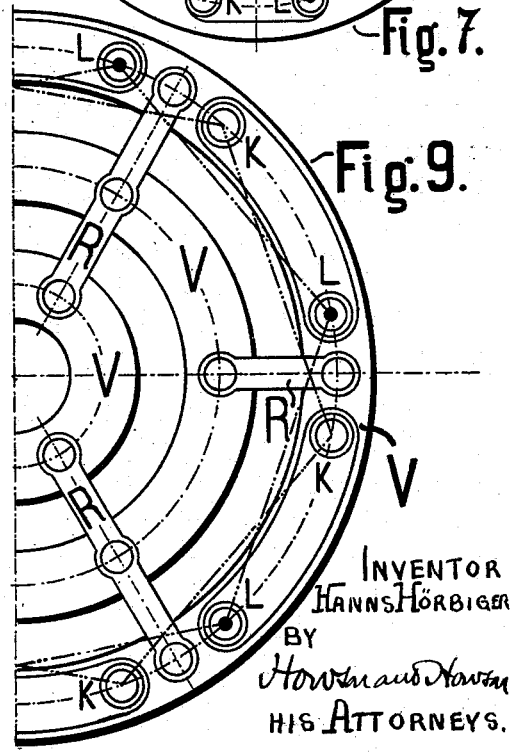

When two or more annular valves are arranged concentrically, the one within the other, as in Figs. 8 and 9, it is sufficient to provide only one of them with the links L K, hereinbefore described, while the other valve-bodies are carried by rigid radial arms R, secured to the link-supported valve-body.

I claim as my invention—

1. In combination with a valve consisting of a thin circular metal plate having a concentric central hole, a valve-seat, a link-carrier opposite the valve-seat and two or more elastic links, each of which is secured at one end to the valve and at the other end to the link-carrier, such links being arranged symmetrically around the center of the valve and at a comparatively small angle to the plane of the valve-body and tangentially to a circle concentric to the axis of the valve.

2. In combination with a valve, consisting of a thin circular metal plate, having a concentric central hole, a valve-seat, one or more thin buffer-plates similar and parallel to the valve and secured on the back thereof with the interposition of washers, a link-carrier opposite the valve-seat and two or more elastic links arranged symmetrically around the center of the valve, each of such links being secured at one end to the valve and at the other to the link-carrier, making a comparatively small angle with the plane of the valve-body and being tangential to a circle concentric with the axis of the valve.

3. In combination with a valve consisting of a thin circular metal plate, having a concentric central hole, a valve-seat, one or more supporting-rings between and concentric to the two valve-seat edges, a link-carrier opposite the valve-seat and two or more elastic links, arranged symmetrically around the center of the valve, each of such links being secured at one end to the valve, making a comparatively small angle with the plane of the valve-body and at the other to the link-carrier and being tangential to a circle concentric with the axis of the valve.

4. In combination with a valve, consisting of a thin circular metal plate, having a concentric central hole, a valve-seat, a link-carrier opposite the valve-seat, two or more elastic links arranged symmetrically around the center of the valve, each of such links being secured at one end to the valve and at the other to the link-carrier making a comparatively small angle with the plane of the valve-body and being tangential to a circle concentric with the axis of the valve, one or more valves similar and concentric to the first-mentioned valve and connected therewith by radial arms and seats for the last-mentioned valve or valves.

In testimony whereof I have signed my name to this specification in the presence of two subscribing witnesses.

HANNS HÖRBIGER.

Witnesses:
　EUGEN BRAUN,
　JOSEF MISKOLCSI.